United States Patent
Kim et al.

(10) Patent No.: US 8,031,055 B2
(45) Date of Patent: Oct. 4, 2011

(54) TAG AUTHENTICATION METHOD USING ROTATION, AND TAG AND READER PERFORMING THE METHOD

(75) Inventors: Eunah Kim, Seoul (KR); Jeong Hyun Yi, Daejeon (KR); Taekyoung Kwon, Seoul (KR); Tae Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 878 days.

(21) Appl. No.: 12/034,740

(22) Filed: Feb. 21, 2008

(65) Prior Publication Data
US 2009/0102606 A1   Apr. 23, 2009

(30) Foreign Application Priority Data
Oct. 18, 2007   (KR) .................. 10-2007-0105262

(51) Int. Cl.
*H04Q 5/22* (2006.01)
*H04L 9/32* (2006.01)

(52) U.S. Cl. ............ 340/10.51; 340/10.1; 340/572.1; 713/169; 713/171; 380/262; 380/268

(58) Field of Classification Search ........... 340/10.1, 340/10.51, 572.1, 5.8; 380/258, 46, 262–268; 713/168–169; 708/250, 256
See application file for complete search history.

(56) References Cited

U.S. PATENT DOCUMENTS

| | | | |
|---|---|---|---|
| 6,842,106 B2 | 1/2005 | Hughes et al. | |
| 7,450,010 B1 * | 11/2008 | Gravelle et al. | 340/572.1 |
| 7,680,273 B2 * | 3/2010 | Whitehead et al. | 380/46 |
| 2005/0123133 A1 | 6/2005 | Stewart et al. | |
| 2007/0103274 A1 | 5/2007 | Berthold | |

FOREIGN PATENT DOCUMENTS

| | | |
|---|---|---|
| JP | 2007-25903 | 2/2007 |
| KR | 10-497630 | 6/2005 |
| KR | 10-605138 | 7/2006 |
| KR | 2007-6526 | 1/2007 |
| KR | 10-710759 | 4/2007 |
| KR | 10-720962 | 5/2007 |
| KR | 10-722363 | 5/2007 |
| KR | 10-723862 | 5/2007 |
| KR | 10-723868 | 5/2007 |
| KR | 10-737181 | 7/2007 |
| WO | WO 2004/038644 A2 | 5/2004 |
| WO | WO 2005/031579 A1 | 4/2005 |

OTHER PUBLICATIONS

English Abstract for KR 10-2007-0048541.
English Abstract for KR 10-2007-0054885.
English Abstract for KR 10-2007-0003205.
English Abstract for KR 10-2004-0094061.

* cited by examiner

*Primary Examiner* — Benjamin C Lee
*Assistant Examiner* — Peter Mehravari
(74) *Attorney, Agent, or Firm* — NSIP Law, PC

(57) ABSTRACT

A tag authentication method, and a tag and reader performing the method are provided. The tag authentication method, including: a reader generating a first random number and transmitting the first random number to a tag; the reader receiving a second random number and a first verification value from the tag; the reader computing a second verification value based on the first random number and the second random number; and the reader comparing the first verification value and the second verification value.

18 Claims, 6 Drawing Sheets

TAG AUTHENTICATION METHOD USING ROTATION, AND TAG AND READER PERFORMING THE METHOD

CROSS-REFERENCE TO RELATED APPLICATION

This application claims the benefit of Korean Application No. 2007-105262, filed Oct. 18, 2007, in the Korean Intellectual Property Office, the disclosure of which is incorporated herein by reference.

BACKGROUND OF THE INVENTION

1. Field of the Invention

Aspects of the present invention relate to a tag authentication method using rotation, and a tag and reader performing the method.

2. Description of the Related Art

A personal area network (PAN) refers to a communication network to process necessary information using a portable information terminal. The PAN is smaller than a local area network (LAN), and includes a system which transmit/receives various information using a personal information terminal or a system which uses saltwater of a human body as a conductor to exchange information easily. In the system using saltwater as a conductor, an electric signal of a card computer is transmitted to another card computer by shaking hands. For another example, the PAN can be configured using a radio frequency identification (RFID) system.

The RFID system wirelessly receives/transmits various kinds of data using a particular frequency band. A magnetic strip, a barcode, and the like are easily damaged by wear and a recognition performance thereof gradually deteriorates. However, an RFID system can overcome the above-described disadvantages in the magnetic strip, the barcode, and the like. Accordingly, the RFID system is replacing barcode and magnetic cards in the marketplace, and is the fastest growing segment in security services, time cards, parking management, and goods distribution management fields.

FIG. 1 illustrates an example of a typical RFID system. The RFID system described above generally includes a tag 101, a reader 102, and a back-end database 103. In this instance, a communication environment between the reader 102 and the back-end database 103 can be a secure channel 104, and a communication environment between the reader 102 and the tag 101 can be an insecure channel 105.

As described above, since an insecure channel 105 is used between the reader 102 and the tag 101 in the RFID system, a reliable tag authentication method and a system which can prevent tag spoofing and securely authenticate the tag are needed.

SUMMARY OF THE INVENTION

Aspects of the present invention provide a tag authentication method, tag, and reader performing the tag authentication method which can provide secure authentication of the tag through counterfeiting prevention.

Aspects of the present invention also provide a tag authentication method, tag, and reader performing the tag authentication method which eliminates the need for additional computations by limited resources characteristic of radio frequency identification (RFID) schemes, and thereby can have practical applications.

Aspects of the present invention also provide a tag authentication method, tag, and reader performing the tag authentication method which can prevent an existing attack using a rotation factor and a rotation function, and provide perfect synchronization between a reader and tag.

According to an aspect of the present invention, there is provided a tag authentication method, including: generating a first random number and transmitting the first random number to a tag by reader; receiving a second random number and a first verification value from the tag by the reader; computing a second verification value based on the first random number and the second random number by the reader; and comparing the first verification value and the second verification value by the reader.

According to an aspect of the present invention, the computing of the second verification value includes: generating a rotation factor using the second random number and a first secret value; and computing the second verification value based on the first random number, a second secret value, and the rotation factor.

According to an aspect of the present invention, the rotation factor includes a first rotation factor and a second rotation factor, and the computing of the second verification value includes: shifting one bit of the first random number by a first rotation factor; shifting one bit of the second secret value by a second rotation factor; and computing the second verification value based on the bit-shifted first random number and the bit-shifted second secret value.

According to another aspect of the present invention, there is provided a tag authentication method, including: generating a second random number by tag; receiving a first random number from a reader by the tag; computing a first verification value based on the first random number and the second random number by the tag; and transmitting the second random number and the first verification value to the reader by the tag.

According to another aspect of the present invention, there is provided a reader, including: a first random number unit to generate a first random number and transmit the first random number to a tag; a receiving unit to receive a second random number and a first verification value from the tag; a second verification value computation unit to compute a second verification value based on the first random number and the second random number; and a comparison unit to compare the first verification value and the second verification value.

According to another aspect of the present invention, there is provided a tag, including: a second random number generation unit to generate a second random number; a first random number receiving unit to receive a first random number from a reader; a first verification value computation unit to compute a first verification value based on the first random number and the second random number; and a transmission unit to transmit the second random number and the first verification value to the reader.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
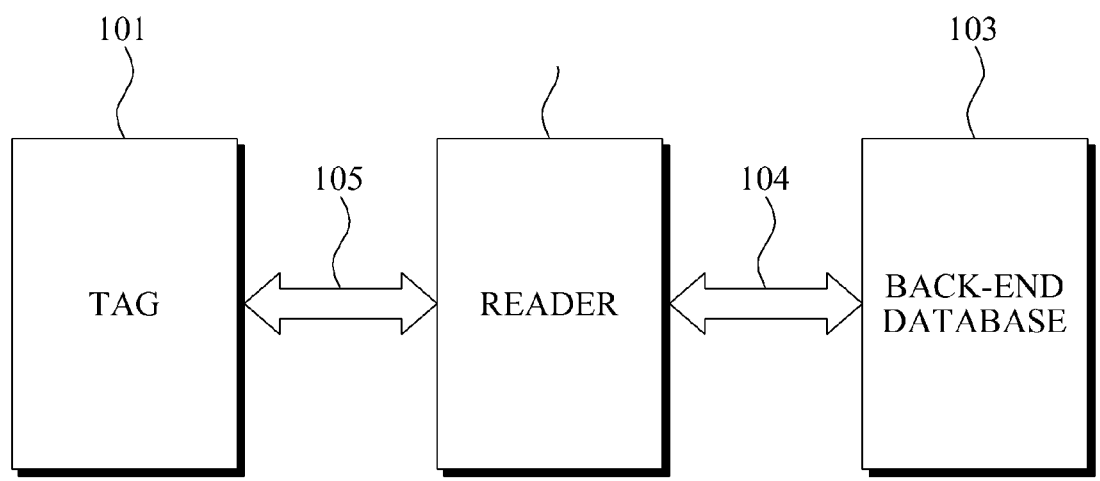
FIG. 1 illustrates an example of a typical RFID system.

Reference will now be made in detail to aspects of the present invention, examples of which are illustrated in the accompanying drawings, wherein like reference numerals refer to the like elements throughout. The aspects are described below in order to explain the present invention by referring to the figures.

Figure 2:
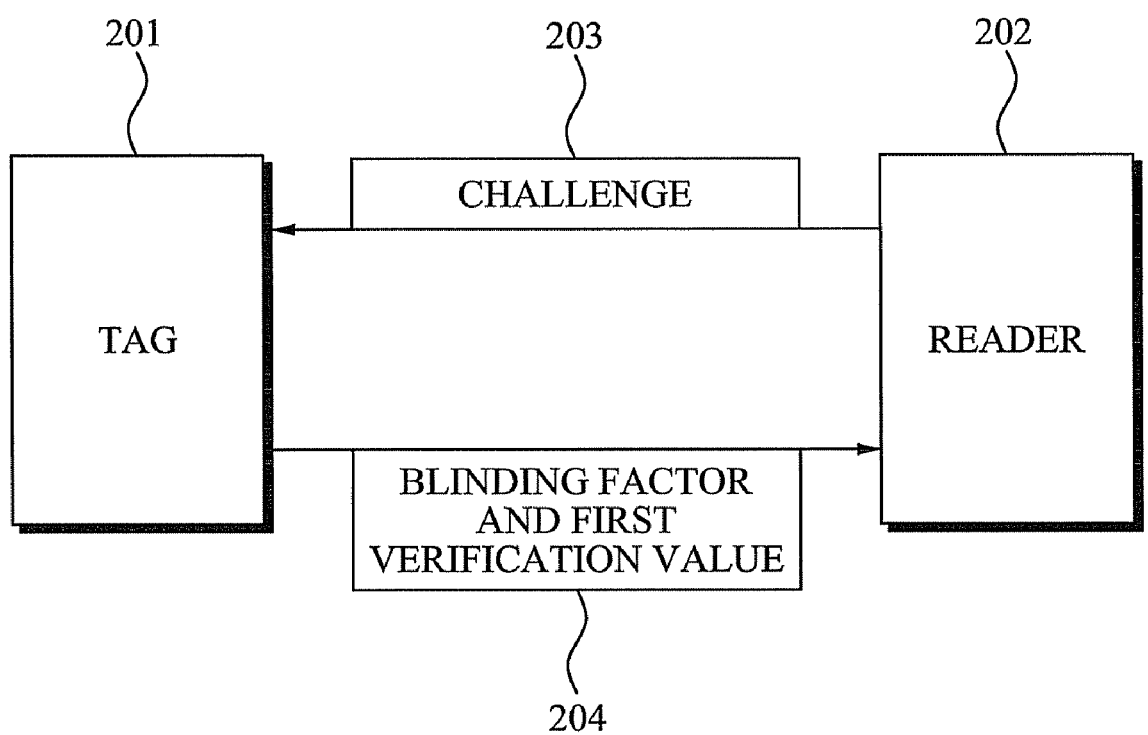
FIG. 2 illustrates an example of a tag authentication system according to an aspect of the present invention.

FIG. 2 illustrates an example of a tag authentication system according to an aspect of the present invention. The tag authentication system can include a tag 201 and a reader 202. A communication environment between the tag 201 and the reader 202 is an insecure channel. Accordingly, the reader 202 needs to perform an authentication operation between the tag 201 and the reader 202 in order to prevent or lessen a spoofing attack of the tag 201 and to determine whether the tag 201 is legitimate.

In this instance, according to an aspect of the present invention, the reader 202 can authenticate the tag 201 through a two (2)-path, r-round communication procedure. In the two (2)-path, r-round communication, the reader 202 transmits a challenge (or a query) 203 to the tag 201, and the tag 201 transmits a first verification value and a blinding factor 204 corresponding to the challenge (or the query) 203 to the reader 202. In this instance, a round refers to a single authentication attempt between the tag 201 and the reader 202. A complete authentication between the tag 201 and the reader 202 can be performed through an r number of rounds. The authentication attempts to complete authentication are referred to as a session. Also, the tag 201 and the reader 202 compute a verification value using a rotation function, and thus, a practical verification operation can be performed even with the tag 201 having only a limited resource, as the cost of the operation is relatively small as a result of using the rotation function. In aspects of the present invention, a blinding factor refers to that which is used to disguise information.

Figure 3:
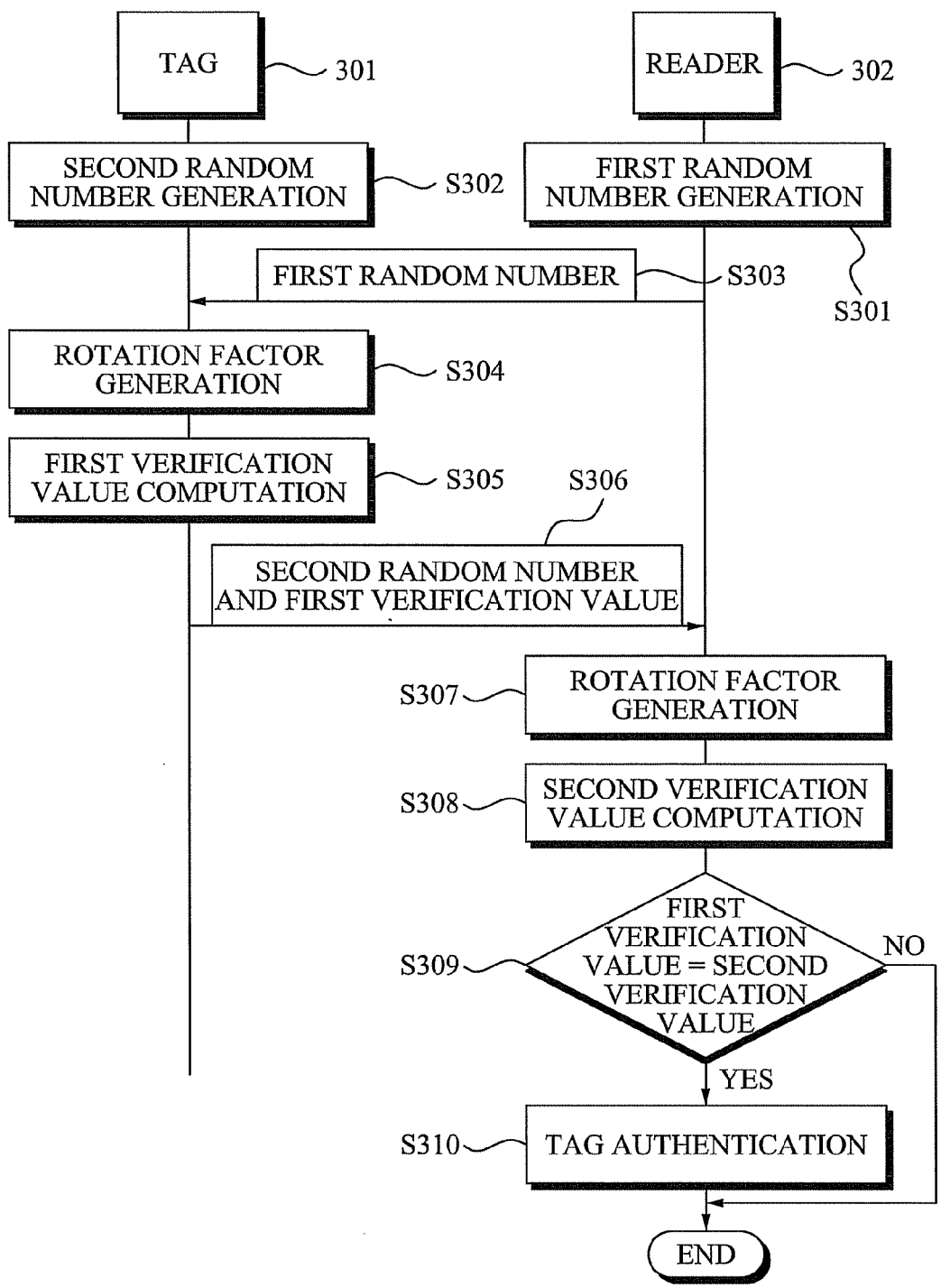
FIG. 3 illustrates a tag authentication method according to an aspect of the present invention.

FIG. 3 illustrates a tag authentication method according to an aspect of the present invention. A tag 301 and a reader 302 share a first secret value, second secret value, and random variable.

In operation S301, the reader 302 generates a first random number for a challenge or a query. In operation S302, the tag 301 generates a second random number as a blinding factor. In this instance, since the second random number is used in operation S304, the generating of the second random number in operation S302 can be performed prior to operation S301 or after operation S303.

In operation S303, the reader 302 transmits the first random number to the tag 301. In operation S304, the tag 301 generates a rotation factor using the second random number and the first secret value. In this instance, the rotation factor can include a first rotation factor and a second rotation factor. In this instance, the tag 301 can separate a first computation result between the second random number and the first secret value, or separate a second computation result among the first random number, the second random number, and the first secret value, to thereby generate the first rotation factor and the second rotation factor. That is, the first computation result may be separated into the first rotation factor and the second rotation factor. Likewise, the second computation result may be separated into the first rotation factor and the second rotation factor. The first and second rotation factors from the respective first computation result or the second computation result may be used together.

Also, the first random number, the second random number, and the first secret value can be k bits in length, and the first computation result or the second computation result can also be k bits in length. In this instance, the first rotation factor can correspond to a bit sequence from $k^{th}$ to $k/2^{th}$ bit of the first computation result or the second computation result, and the second rotation factor can correspond to a bit sequence from $k/2-1^{th}$ to $1^{st}$ bit of the first computation result or the second computation result. For example, the first rotation factor and the second rotation factor can be computed as Equation 1 or Equation 2:

$$\rho_1 \leftarrow (b \oplus s)_{[k, k/2]}$$
$$\rho_2 \leftarrow (b \oplus s)_{[k/2-1, 0]}, \text{ or} \qquad \text{[Equation 1]}$$

$$\rho_1 \leftarrow (a \oplus b \oplus s)_{[k, k/2]}$$
$$\rho_2 \leftarrow (a \oplus b \oplus s)_{[k/2-1, 0]} \qquad \text{[Equation 2]}$$

Here, $\rho_1$ is the first rotation factor, b is the second random number, s is the first secret value, $\rho_2$ is the second rotation factor, and a is the first random number. Also, $\oplus$ denotes an XOR operator.

Thus, although a rotation factor is generated using a secret value, such as s, the secret value, such as s, is not exposed. Also, a value of the rotation factor cannot be estimated. Accordingly, a successful guessing attack with respect to the first secret value and the second secret value through a first verification value can be prevented or reduced.

In operation S305, the tag 301 computes the first verification value based on the first random number, the second secret value, and the rotation factor. In this instance, the tag 301 shifts one bit of the second random number by the first rotation factor, shifts one bit of the second secret value by the second rotation factor, and thereby can compute the first verification value based on the bit-shifted first random number, the bit-shifted second secret value, and noise. For example, the tag 301 can compute the first verification value as Equation 3:

$$z = \text{rot}(a, \rho_1) \cdot \text{rot}(x, \rho_2) \oplus v \qquad \text{[Equation 3]}$$

Here, z is the first verification value, rot( ) is a rotation function, x is the second secret value, and v denotes whether the noise determined by the random variable exists. In this instance, the random variable can include a probability of the noise occurring in a single session of r-rounds.

In operation S306, the tag 301 transmits the first verification value, and the second random number generated as the blinding factor, to the reader 302. In operation S307, the reader 302 generates a rotation factor using the second random number and the first secret value. In this instance, the first random number, the second random number, and the first secret value can be k bits in length. The rotation factor can include a first rotation factor and a second rotation factor.

In this instance, the reader 302 can separate a first computation result between the second random number and the first secret value, or separate a second computation result among the first random number, the second random number, and the first secret value, and generate the first rotation factor and the second rotation factor.

Also, the first rotation factor can correspond to a bit sequence from $k^{th}$ to $k/2^{th}$ bit of the first computation result or the second computation result, and the second rotation factor can correspond to a bit sequence from k/2-1$^{th}$ to 1$^{st}$ bit of the first computation result or the second computation result. For example, the first rotation factor and the second rotation factor can be computed as Equation 1 or Equation 2. That is, in operation S307, the reader 302 can compute the rotation factor in the same way as operation S304.

In operation S308, the reader 302 computes the second verification value based on the first random number, second secret value, and the rotation factor. In this instance, the reader 302 shifts one bit of the first random number by the first rotation factor, and shifts one bit of the second secret value by the second rotation factor, and thereby can compute the second verification value based on the bit-shifted first random number and the bit-shifted second secret value. For example, the reader 302 can compute the second verification value as Equation 4:

$$z'=rot(a,\rho_1)\cdot rot(x,\rho_2). \quad \text{[Equation 4]}$$

Here, z' is the second verification value, rot( ) is a rotation function, and x is the second secret value.

In operation S309, the reader 302 compares the first verification value and the second verification value. When the first verification value is the same as the second verification value, the reader 302 authenticates the tag 301 in operation S310, and when the first verification value is different from the second verification value, the reader 302 ends operations.

Operation S301 through operation S310 described above is a single round. The tag authentication method can probabilistically authenticate the tag 301 according to a number of successful authentication rounds in a single session of r-rounds.

Figure 4:
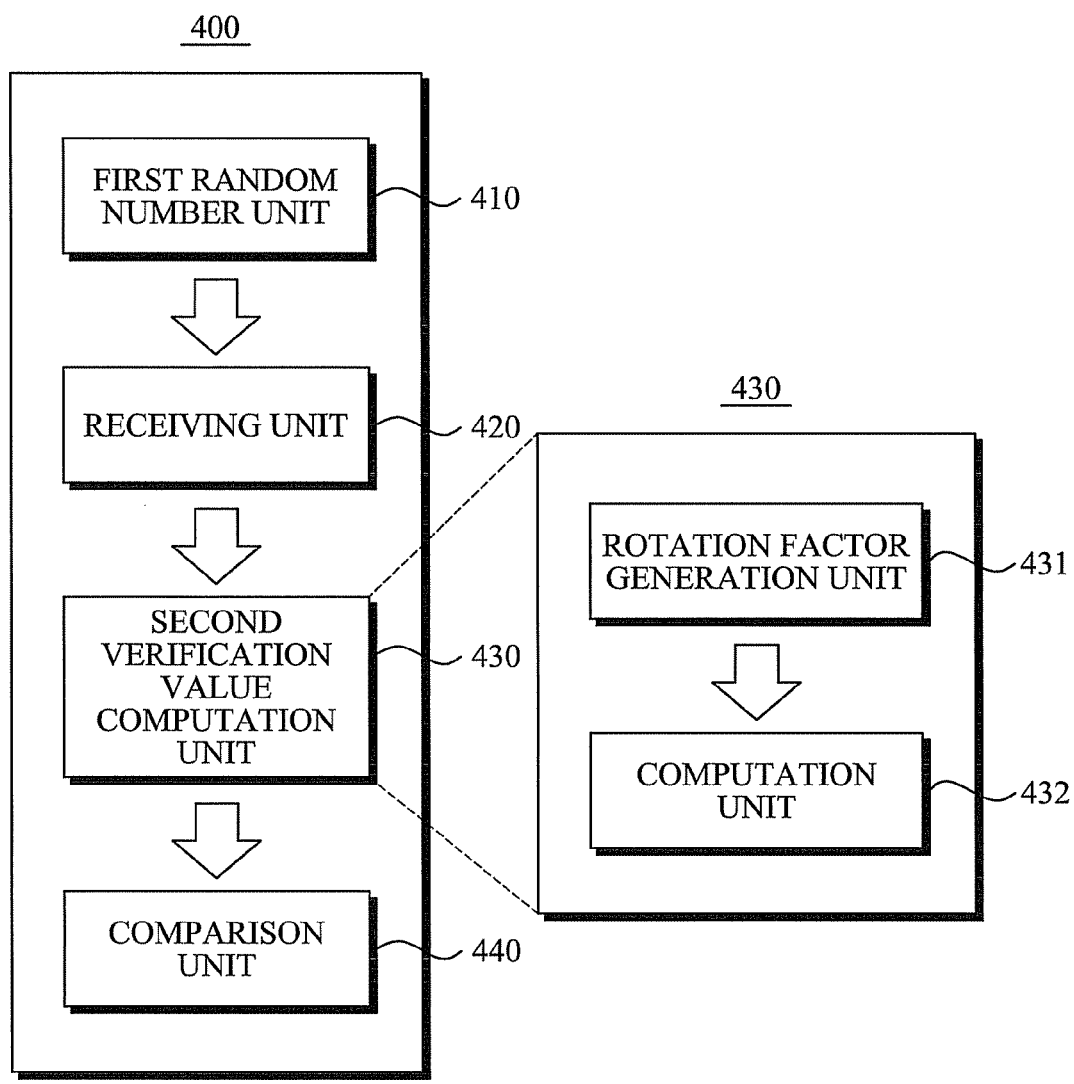
FIG. 4 illustrates a configuration of a reader according to an aspect of the present invention.

FIG. 4 illustrates a configuration of a reader 400 according to an aspect of the present invention. As illustrated in FIG. 4, the reader 400 includes a first random number unit 410, a receiving unit 420, a second verification value computation unit 430, and a comparison unit 440.

The first random number unit 410 generates a first random number and transmits the first random number to a tag. The reader 400 and the tag share a first secret value, a second secret value, and a random variable. In this instance, the random variable includes a probability of noise occurring in a single session of r-rounds. The receiving unit 420 receives a second random number and a first verification value from the tag.

The second verification value computation unit 430 computes a second verification value based on the first random number and the second random number. In this instance, the second verification value computation unit 430 can include a rotation factor generation unit 431 and a computation unit 432 in order to compute the second verification value.

The rotation factor generation unit 431 generates a rotation factor using the second random number and the first secret value. The rotation factor is used to compute the second verification value. In this instance, the rotation factor generation unit 431 can separate a first computation result between the second random number and the first secret value, or separate a second computation result among the first random number, the second random number, and the first secret value, and thereby can generate a first rotation factor and a second rotation factor.

The first random number, the second random number, the first secret value, the first computation result and the second computation result can be k bits in length. In this instance, the first rotation factor can correspond to a bit sequence from k$^{th}$ to k/2$^{th}$ bit of the first computation result or the second computation result, and the second rotation factor can correspond to a bit sequence from k/2-1$^{th}$ to 1$^{st}$ bit of the first computation result or the second computation result. For example, the rotation factor generation unit 431 can generate the rotation factor through Equation 1 or Equation 2 as described above.

The computation unit 432 computes the second verification value based on the first random number, the second secret value, and the rotation factor. A method of computing the second verification value based on the first random number, the second secret value, and the rotation factor is described in detail with reference to FIG. 6.

The comparison unit 440 compares the first verification value received from the tag, and the second verification value computed by the second verification value computation unit 430. When the first verification value is the same as the second verification value, the comparison unit 440 can authenticate the tag for that round. In this instance, the reader 400 repeats two (2)-path round for an r number of times, and can probabilistically authenticate the tag according to the number of successful authentication rounds.

Figure 5:
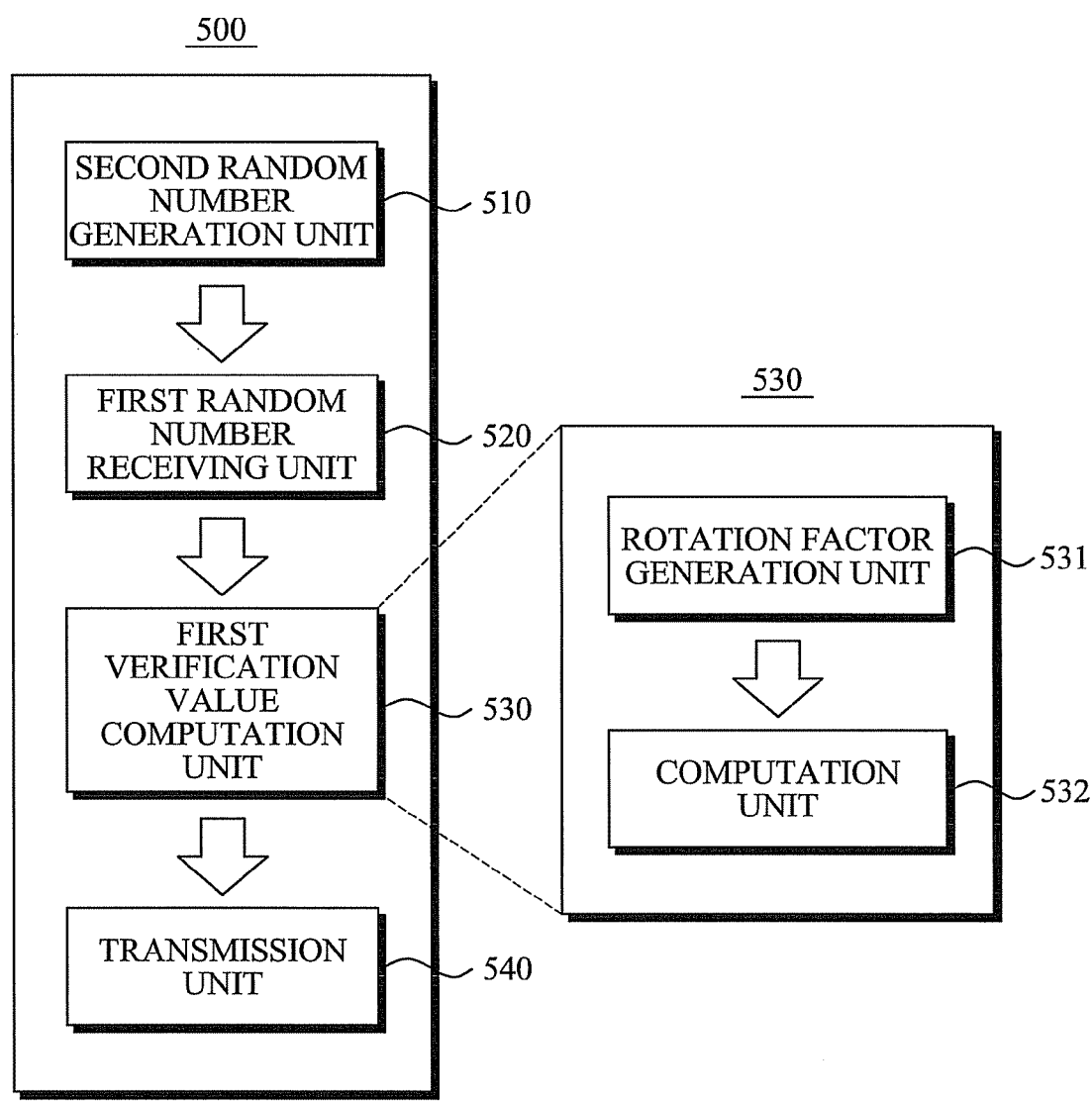
FIG. 5 illustrates a configuration of a tag according to an aspect of the present invention.

FIG. 5 illustrates a configuration of a tag 500 according to an aspect of the present invention. As illustrated in FIG. 5, the tag 500 includes a second random number generation unit 510, a first random number receiving unit 520, a first verification value computation unit 530, and a transmission unit 540.

The second random number generation unit 510 generates a second random number as a blinding factor. The first random number receiving unit 520 receives a first random number from a reader. The tag 500 and the reader share a first secret value, a second secret value, and a predetermined random variable. The random variable includes a probability of noise occurring in a single session of r-rounds.

The first verification value computation unit 530 computes a first verification value based on the first random number and the second random number. For this, the first verification value computation unit 530 can include a rotation factor generation unit 531 and a computation unit 532, as illustrated in FIG. 5.

The rotation factor generation unit 531 generates a rotation factor using the second random number and the first secret value. In this instance, the rotation factor generation unit 531 can separate a first computation result between the second random number and the first secret value, or separate a second computation result among the first random number, the second random number, and the first secret value, and thereby can generate the first rotation factor and the second rotation factor.

Here, the first random number, the second random number, the first secret value, the first computation result, and the second computation result can be k bits in length. In this instance, the first rotation factor can correspond to a bit sequence from k$^{th}$ to k/2$^{th}$ bit of the first computation result or the second computation result, and the second rotation factor can correspond to a bit sequence from k/2-1$^{th}$ to 1$^{st}$ bit of the first computation result or the second computation result. For example, the rotation factor generation unit 531 can compute the rotation factor through Equation 1 or Equation 2 as described above.

The computation unit 532 computes the first verification value based on the first random number, the second secret value, and the rotation factor. A method of computing the first verification value based on the first random number, the second secret value, and one of the rotation factors is described in detail with reference to FIG. 6.

The transmission unit 540 transmits the second random number and the first verification value to the reader. The reader can compute a second verification value using the received second random number, first verification value, and the first random number. Also, the tag 500 with respect to a single round can be authenticated by comparing the first verification value and the second verification value.

Figure 6:
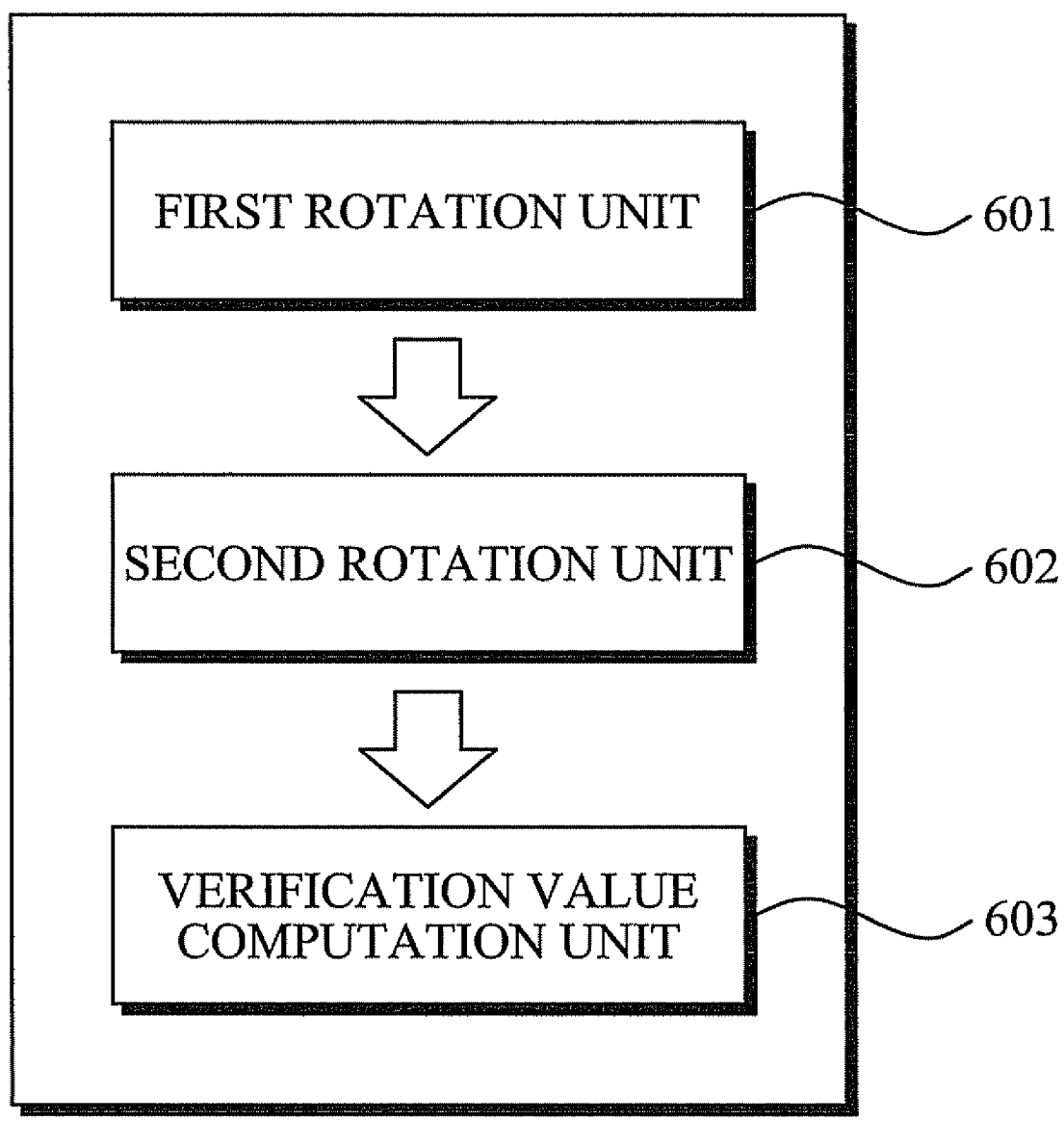
FIG. 6 illustrates an example of a configuration of the computation unit of FIG. 4 or 5.

FIG. 6 illustrates an example of a configuration of a computation unit 432 or 532. As illustrated in FIG. 6, a first rotation unit 601, a second rotation unit 602, and a verification value computation unit 603 can be included in the computation unit 432 described with reference to FIG. 4 or the computation unit 532 described with reference to FIG. 5. In this instance, the first rotation unit 601 and the second rotation unit 602 are identically operated regardless of whether the first rotation unit 601 and the second rotation unit 602 are included in the computation unit 432 or the computation unit 532. Conversely, the verification value computation unit 603 can be operated differently depending on whether the first rotation unit 601 and the second rotation unit 602 are included in the computation unit 432 or the computation unit 532.

The first rotation unit 601 shifts one bit of a first random number by a first rotation factor. For example, the first rotation unit 601 can perform a bit-shift operation by a number of the first rotation factor with respect to one bit of the first random number.

The second rotation unit 602 shifts one bit of a second secret value by a second rotation factor. For example, the second rotation unit 602 can perform a bit-shift operation by a number of the second rotation factor with respect to one bit of the second secret value.

According to an aspect of the present invention, a tag is authenticated using a rotation imbued with stability, and thus secure authentication of the tag can be performed even in a replay attack or a man-in-the-middle attack.

When the verification value computation unit 603 is included in the computation unit 532, the verification value computation unit 603 computes the first verification value based on the bit-shifted first random number, the bit-shifted second secret value, and noise. The noise is determined based on the random variable described with reference to FIG. 4. For example, the noise can be represented as Equation 5:

$$v \in 0,1 | \text{Prob}[v=1] = \eta.$$ [Equation 5]

Here, v is the noise, $\eta$ is the random variable, and Prob [v=1] denotes a probability that v is 1.

Conversely, when the verification value computation unit 603 is included in the computation unit 432, the verification value computation unit 603 computes the second verification value based on the bit-shifted first random number, the bit-shifted second secret value, and the rotation factor. That is, the noise does not affect the computation of the second verification value.

In an aspect of the present invention, use of the first and second random numbers are interchangeable so that the first random number may be used instead of the second random number, and vice versa. In another aspect of the present invention use of the first and second secret values are interchangeable so that the first secret value may be used instead of the second secret value, and vice versa.

Various components of the reader or the tag can be integrated into fewer units or a single control unit, or alternatively, can be implemented in software or hardware, such as, for example, a field programmable gate array (FPGA), or an application specific integrated circuit (ASIC). As such, it is intended that the processes described herein be broadly interpreted as being equivalently performed by software, hardware, or a combination thereof. Software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs).

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

Although a few embodiments of the present invention have been shown and described, it would be appreciated by those skilled in the art that changes may be made to this embodiment without departing from the principles and spirit of the invention, the scope of which is defined in the claims and their equivalents.

What is claimed is:

1. A tag authentication method of a reader, the method comprising:
    generating a first random number and transmitting the first random number to a tag;
    receiving a second random number and a first verification value from the tag;
    generating a rotation factor using the second random number and a first secret value;
    computing a second verification value based on the first random number, a second secret value, and the rotation factor; and
    comparing the first verification value and the second verification value.

2. The tag authentication method of claim 1, wherein the generating the rotation factor comprises:
    separating a first computation result of the second random number and the first secret value, or separating a second computation result of the first random number, the second random number, and the first secret value, to generate a first rotation factor and a second rotation factor.

3. The tag authentication method of claim 1, wherein the rotation factor includes a first rotation factor and a second rotation factor, and
    the computing of the second verification value comprises:
        shifting one bit of the first random number by a first rotation factor;
        shifting one bit of the second secret value by a second rotation factor; and
        computing the second verification value based on the bit-shifted first random number and the bit-shifted second secret value.

4. The tag authentication method of claim 1, wherein the reader and the tag share a first secret value, a second secret value, and a predetermined random variable.

5. The tag authentication method of claim 4, wherein the predetermined random variable includes a probability of noise that occurs during the authentication of the tag.

6. A tag authentication method of a tag, the method comprising:
    generating a second random number;
    receiving a first random number from a reader;
    generating a rotation factor using the second random number and a first secret value;

computing a first verification value based on the first random number, a second secret value, and the rotation factor; and transmitting the second random number and the first verification value to the reader.

7. The tag authentication method of claim 6, wherein the rotation factor includes a first rotation factor and a second rotation factor, wherein the computing of the first verification value comprises:

shifting one bit of the first random number by the first rotation factor;

shifting one bit of the second secret value by the second rotation factor; and computing the first verification value based on the bit-shifted first random number, the bit-shifted second secret value, and noise.

8. The tag authentication method of claim 6, wherein the generating of the rotation factor comprises:

separating a first computation result of the second random number and the first secret value, or separating a second computation result of the first random number, the second random number, and the first secret value, to generate a first rotation factor and a second rotation factor.

9. The tag authentication method of claim 8, wherein the first rotation factor corresponds to a bit sequence from $k^{th}$ to $k/2^{th}$ bit of the first computation result or the second computation result, and the second rotation factor corresponds to a bit sequence from $k/2-1^{th}$ to $1^{st}$ bit of the first computation result or the second computation result.

10. The tag authentication method of claim 6, wherein the reader and the tag share a first secret value, a second secret value, and a predetermined random variable.

11. A reader for authenticating a tag, the reader comprising:

a first random number unit to generate a first random number and to transmit the first random number to the tag;

a receiving unit to receive a second random number and a first verification value from the tag;

a second verification value computation unit to generate a rotation factor using the second random number and a first secret value, and to compute a second verification value based on the first random number, a second secret value, and the rotation factor; and a comparison unit to compare the first verification value and the second verification value.

12. The reader of claim 11, wherein the second verification value computation unit comprises:

a rotation factor generation unit to generate the rotation factor using the second random number and the first secret value.

13. The reader of claim 12, wherein the rotation factor includes a first rotation factor and a second rotation factor, and the second verification value computation unit computes the second verification value based on the first random number with one bit being shifted by the first rotation factor, and computes the second secret value with one bit being shifted by the second rotation factor.

14. The reader of claim 12, wherein the rotation factor generation unit separates a first computation result of the second random number and the first secret value, or separates a second computation result of the first random number, the second random number, and the first secret value, to generate a first rotation factor and a second rotation factor.

15. A tag to be authenticated by a reader, the tag comprising:

a second random number generation unit to generate a second random number;

a first random number receiving unit to receive a first random number from the reader;

a first verification value computation unit to generate a rotation factor using the second random number and a first secret value, and to compute a first verification value based on the first random number, a second secret value, and the rotation factor; and a transmission unit to transmit the second random number and the first verification value to the reader.

16. The tag of claim 15, wherein the first verification value computation unit comprises:

a rotation factor generation unit to generate the rotation factor using the second random number and the first secret value.

17. The tag of claim 16, wherein the rotation factor includes a first rotation factor and a second rotation factor, and the first verification value computation unit computes the first verification value based on the first random number with one bit being shifted by the first rotation factor, and computes the second secret value with one bit being shifted by the second rotation factor, and noise.

18. The tag of claim 15, wherein the reader and the tag share a first secret value, a second secret value, and a predetermined random variable, and the random variable includes a probability of noise that occurs during the authentication of the tag.

* * * * *